(12) United States Patent
Benner

(10) Patent No.: US 6,986,584 B2
(45) Date of Patent: Jan. 17, 2006

(54) ARRANGEMENT FOR A ROTATABLE EYEPIECE CAP

(75) Inventor: Thomas Benner, Hohenahr-Altenkirchen (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 11/008,236

(22) Filed: Dec. 10, 2004

(65) Prior Publication Data

US 2005/0128593 A1   Jun. 16, 2005

(30) Foreign Application Priority Data

Dec. 11, 2003  (DE) ............................... 103 58 404

(51) Int. Cl.
*G02B 23/16* (2006.01)
*G03B 11/04* (2006.01)

(52) U.S. Cl. ..................... 359/600; 359/511; 359/611

(58) Field of Classification Search ........ 359/511–514, 359/600, 611–612, 800–830; 396/448

See application file for complete search history.

(56) References Cited

U.S. PATENT DOCUMENTS

| 4,384,767 | A | * | 5/1983 | Kawai ........................ 359/611 |
| 4,572,612 | A | * | 2/1986 | Schlapp et al. ............. 359/827 |
| 5,576,892 | A | * | 11/1996 | Hotta et al. ................. 359/696 |
| 5,784,207 | A | * | 7/1998 | Satoh ........................ 359/700 |
| 6,280,040 | B1 | * | 8/2001 | Koide ........................ 359/600 |
| 6,779,899 | B2 | | 8/2004 | Syre et al. ................. 359/600 |

FOREIGN PATENT DOCUMENTS

DE         101 39 173 C1      10/2002

* cited by examiner

*Primary Examiner*—Thong Q Nguyen
(74) *Attorney, Agent, or Firm*—Foley & Lardner LLP

(57) ABSTRACT

An arrangement is specified for rotatable adjustment of a cap (2) on an eyepiece housing (1), with the cap (2) having grooves (3) on its inner face, which rise in the axial direction and have defined latching depressions (4) in the sliding bases (11) of the grooves (3), and pins (5) which point radially outwards being arranged on the eyepiece housing (1) and engaging with sliding bases (11) of the grooves (3) and resting on the sliding bases (11) of the grooves (3) and in the latching depressions (4) in a prestressed manner. The arrangement comprises the pins (5) being mounted in a sprung manner in the eyepiece housing (1).

6 Claims, 4 Drawing Sheets

ARRANGEMENT FOR A ROTATABLE EYEPIECE CAP

CROSS REFERENCE

The present application claims priority under 35 U.S.C. §119 to German Application 103 58 404.8, filed Dec. 11, 2003, the contents of which are incorporated by reference.

BACKGROUND OF THE INVENTION

The invention relates to an arrangement for rotatable adjustment of a cap on an eyepiece housing.

An arrangement such as this is disclosed in DE 101 39 173 C1. In the known arrangement, the pins are arranged fixed in the eyepiece housing. The pins are screwed and fixed so far into the eyepiece housing that their heads are at least approximately at the same distance from the longitudinal axis of the eyepiece housing.

The cap which is placed onto the eyepiece housing has grooves which rise in the axial direction on its inner face, and in which latching depressions are arranged at defined points. The distance between the sliding bases of the grooves and of the latching depressions and the longitudinal axis of the eyepiece housing is somewhat shorter than the distance between the heads of the pins and the longitudinal axis. The cap is made of a deformable material, so that the fitting of the sliding bases and of the latching depressions under the heads of the pins when the cap is fitted and the heads of the pins engage in the groove can be absorbed by slight deformation of the cap. On the other hand, the deformation advantageously results in prestressing between the cap and the pins, which on the one hand allows sliding rotation of the cap while on the other hand allowing it to latch securely into the latching depressions.

In practice, it has been found that if the eyepiece housing and the caps have relatively small diameters, the normal manufacturing and assembly tolerances influence the freedom of movement of the rotary adjustment in a non-uniform manner. There may be noticeable play in the latching positions. The deformation of the cap partially results in sliding and jamming. These disadvantages can be overcome only by individual matching of all of the tolerances. The matching process is highly time-consuming.

BRIEF SUMMARY OF THE INVENTION

The invention was thus based on the object of specifying an assembly capability that is not sensitive to tolerances for the principle, which has been proven per se, of rotary mounting of the cap on eyepiece pins in a prestressed manner.

In the case of an arrangement of the type mentioned initially, this object is achieved according to the invention by spring mounting of the pins in the eyepiece housing. The spring pressure which acts on the pins, and the spring movement, must be set to be sufficiently strong that the pin heads rest in a prestressed manner both in the sliding bases of the grooves and in the latching depressions. Tolerances in the lengths of the pins and a possibly different spring pressure can also be absorbed, for example, by deformation of the cap.

One particularly advantageous solution comprises the pins having a foot area which is larger than the pin diameter, and the pins resting on a spring element, which is inserted into a radial annular channel in the eyepiece housing.

This design is highly space-saving and can be used in particular for relatively small eyepiece and cap diameters.

Both elastomer rings and spring rings composed of metal are suitable for use as spring elements.

BRIEF DESCRIPTION OF THE SEVERAL VIEWS OF THE DRAWINGS

The drawings schematically illustrate one exemplary embodiment of the invention, which will be described in more detail with reference to the figures, in which.

DETAILED DESCRIPTION OF THE PREFERRED EMBODIMENTS

Figure 1:
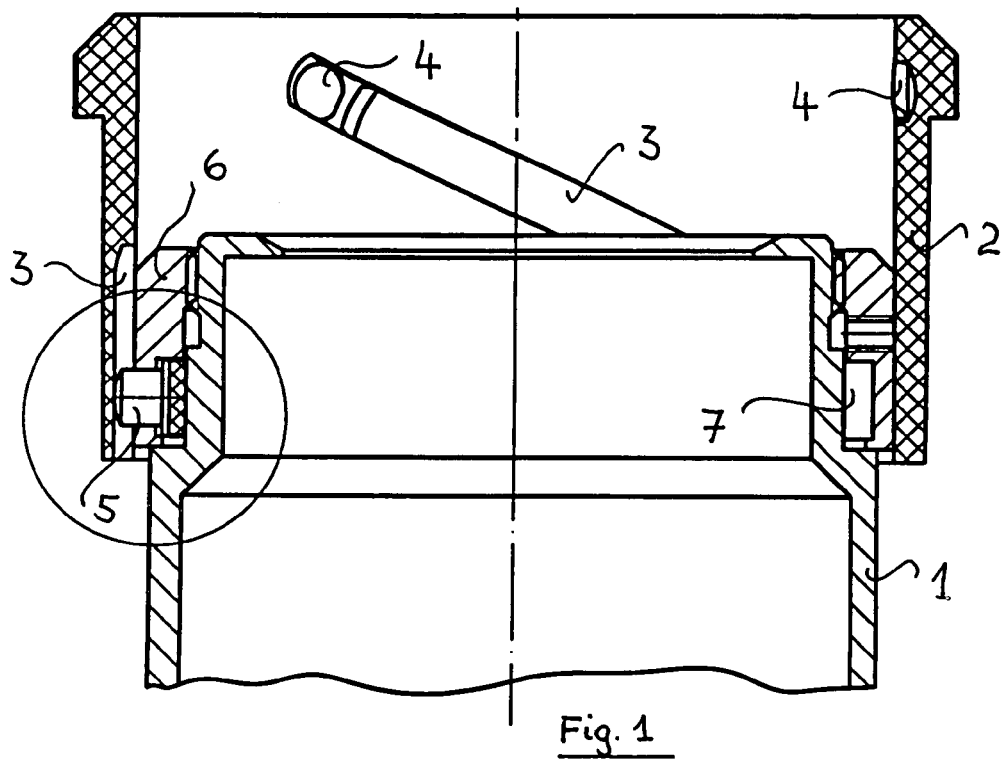
FIG. 1 shows a section through an eyepiece housing and a cap.

FIG. 1 shows an eyepiece housing 1 onto which a cap 2 which can be adjusted rotatably is fitted. The cap 2 contains a groove 3 which rises in the axial direction on its inner face, with a latching depression 4. A rubber eyepiece, which is not illustrated, can be pulled onto the outer face of the cap 2.

Pins 5 which point radially outwards are arranged on the eyepiece housing 1, and engage in, in each case, one of the grooves 3. The grooves are open towards the lower edge of the cap 2. The cap 2 can thus be pulled off the eyepiece housing 1, without any tools, for cleaning. The pins 5 slide in the grooves 3 without any grease lubrication, so that any dust or sand which enters is not held. A holding ring 6 is screwed onto the eyepiece housing 1, in order to hold the pins 5, and, at its lower end, forms an annular channel 7 with the wall of the eyepiece housing 1.

Figure 2:
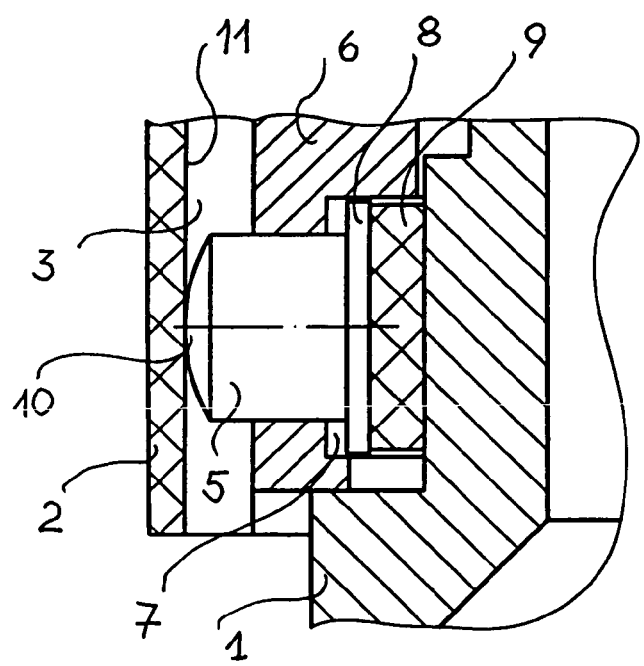
FIG. 2 shows an enlarged detail of the mounting of a pin.

FIG. 2 shows that part of FIG. 1 which is marked with a circle, on an enlarged scale. The pin 5 is guided in a hole in the holding ring 6 such that it can slide. A foot area 8 with a larger diameter is integrally formed on the pin 5 and is located in the annular channel 7. The pin 5 thus cannot fall out of the hole.

A spring element 9 is inserted into the annular channel 7 between the foot area 8 and the wall of the eyepiece housing 1. The spherical head 10 of the pin 5 rests on the sliding base 11 of the groove 3 in a prestressed manner. The spring element 9 is compressed somewhat, so that the foot area 8 is forced into the annular channel 7. The size of the illustrated free spring movement of the pin 5 is such that pressure is still exerted on the spring element 9 even when the pin 5 has been latched into the latching depression 4. Owing to the spherical configuration of the head 10 of the pins 5, the cap 2 can be pushed onto the head 10, which is then pushed up to the maximum extent, during fitting to the eyepiece housing. In this case, the pin 5 is pressed against the spring element 9, thus producing the described prestressing.

Figure 3:
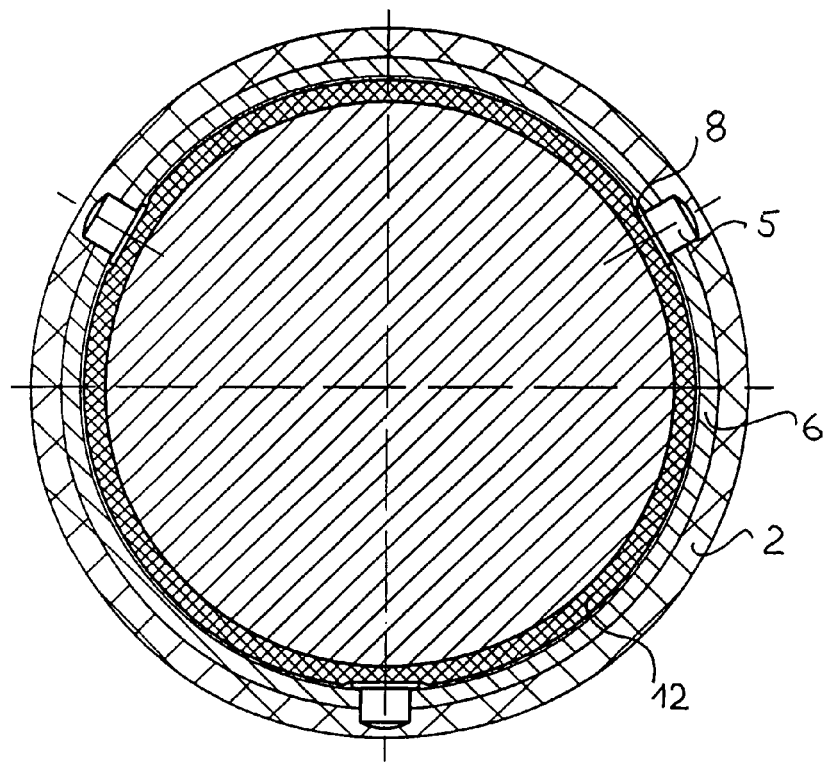
FIG. 3 shows the mounting of the pins on an elastomer ring.

In the embodiment illustrated in FIG. 3, an elastomer ring 12 is provided as the spring element 9. This has, for example, a hardness of 10 and a Shore strength of 17. With an unloaded wall thickness of the elastomer ring 12 of 1.1 mm, this results in prestressing of 15 N on the foot area 8 of the pin in the assembled state. The spring movement of the pin 5 is about 0.3 mm. The diameter of the eyepiece housing 1 is about 29 mm.

Figure 4:
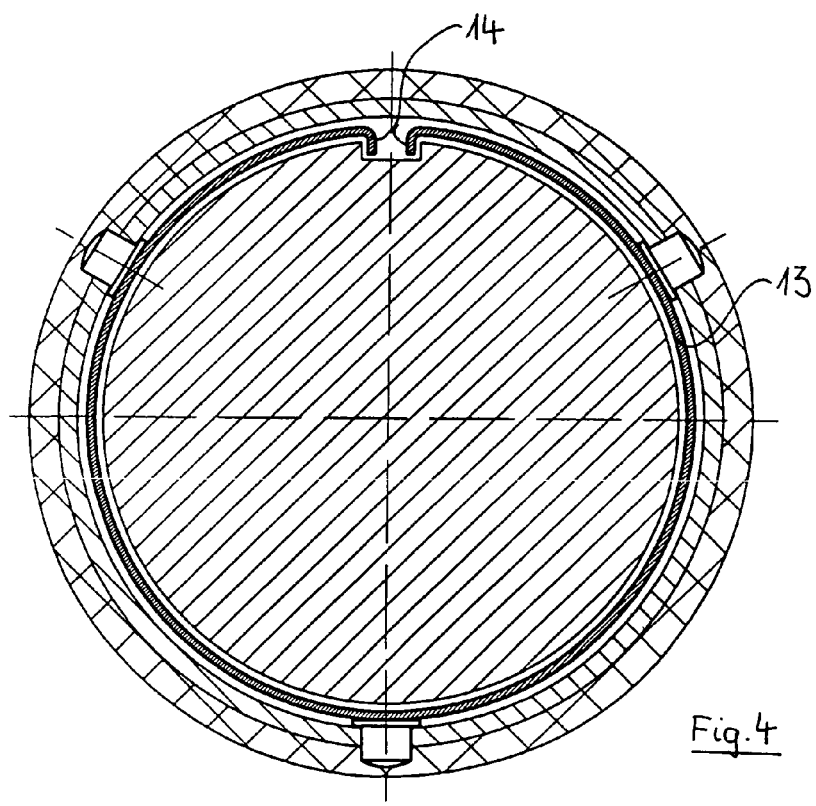
FIG. 4 shows the mounting on a spring ring.
Figure 4A:
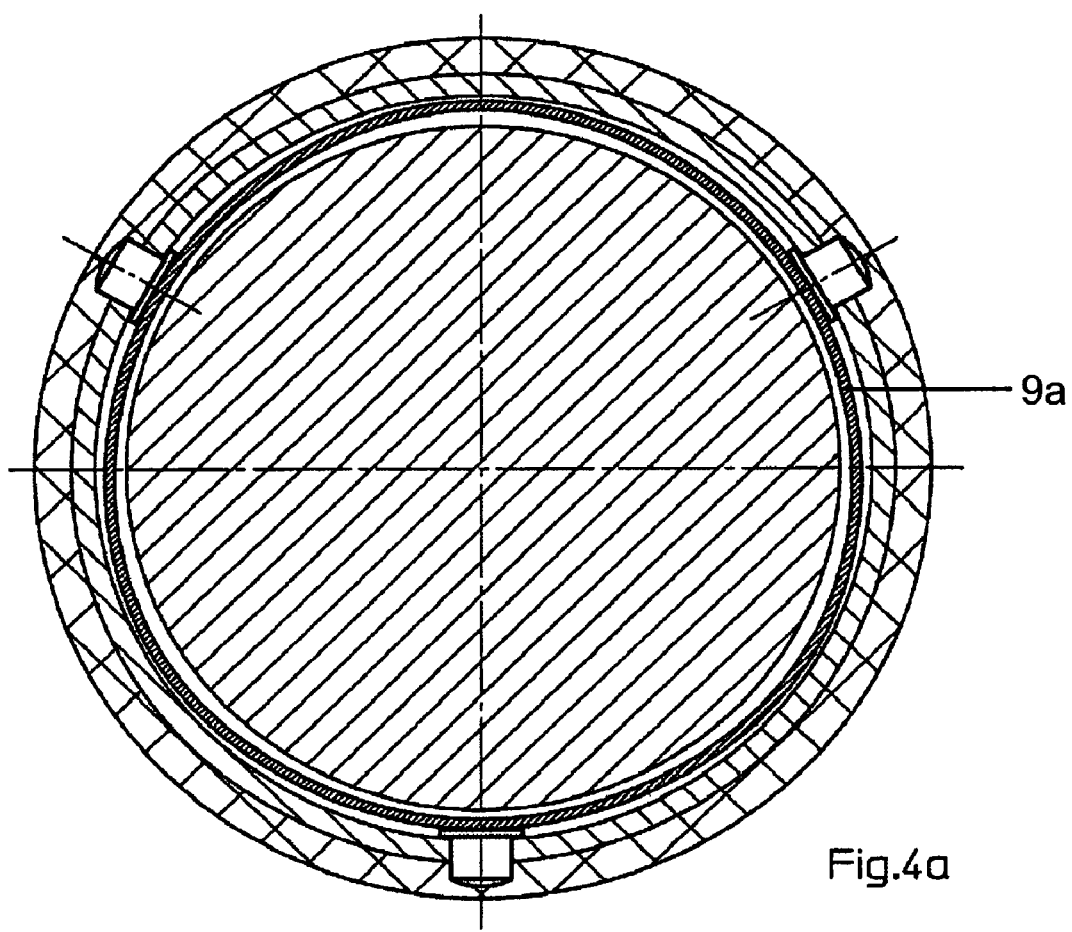
FIG. 4a shows the mounting on a closed spring ring.
Figure 5:
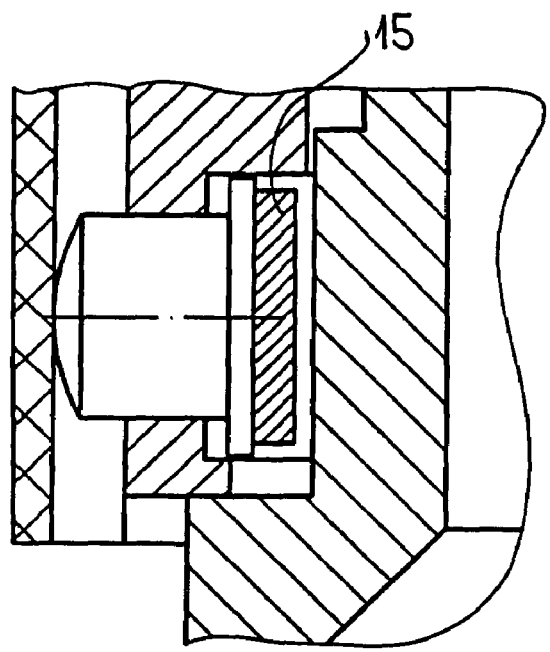
FIG. 5 shows the mounting on a spring strip.
Figure 6:
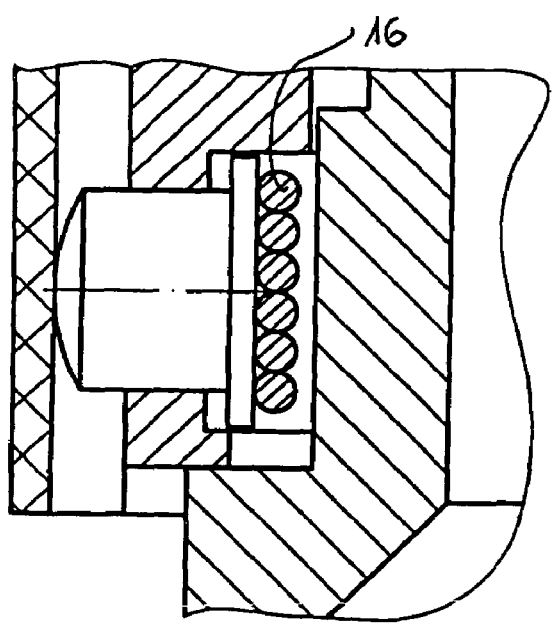
FIG. 6 shows the mounting of a spring wire cylinder which is wound in a spiral shape.

In FIG. 4, an open wire ring 13 is inserted as the spring element 9, and its ends 14 can be pushed towards one another. A closed wire ring 9a, as shown in FIG. 4a, may, of course, also be provided, with the pressure of the pins 5 while the cap 2 is being fitted resulting in corrugated deformation of the circumference of the wire ring. The spring element 9 may, in particular, also be in the form of a flat spring strip 15 composed of metal, and is illustrated in FIG. 5. Another variant comprises a spring wire cylinder 16, which is wound in a spiral shape, as is illustrated in FIG. 6.

List of Reference Symbols

1 Eyepiece housing
2 Cap
3 Groove
4 Latching depression
5 Pin
6 Holding ring
7 Annular channel
8 Foot area
9 Spring element
9a Closed wire ring.
10 Head of the pin
11 Sliding base
12 Elastomer ring
13 Wire ring
14 Spring strip
15 Spring wire cylinder

What is claimed is:

1. An arrangement for rotatable adjustment of a cap on an eyepiece housing, comprising a cap having one or more grooves on its inner face, each of the one or more grooves rising in the axial direction of the cap and having one or more latching depressions in a sliding base of the groove, the arrangement further comprising one or more pins each pin having a foot area that is larger than the pin diameter and which rests on a spring element that is inserted into a radial annular channel of said eyepiece housing, said pins pointing radially outwards and being arranged on the eyepiece housing to engage with the one or more sliding bases and configured to be able to rest on said one or more sliding bases or in said one or more latching depressions in a prestressed manner, wherein the pins are spring-mounted in the eyepiece housing.

2. The arrangement as claimed in claim 1, wherein an elastomer ring is provided as the spring element.

3. The arrangement as claimed in claim 1, wherein a wire ring composed of metal is provided as the spring element.

4. The arrangement as claimed in claim 3, wherein the wire ring is closed.

5. The arrangement as claimed in claim 1, wherein a flat spring strip is provided as the spring element.

6. The arrangement as claimed in claim 1, wherein a spring wire cylinder wound in a spiral shape is provided as the spring element.

* * * * *